Sept. 24, 1940. E. L. SHAW 2,215,939

BORING-ROUTING TOOL

Filed June 9, 1938

Inventor
E. L. SHAW
by Kenway & Witter
Attorneys

Patented Sept. 24, 1940

2,215,939

UNITED STATES PATENT OFFICE 2,215,939

BORING-ROUTING TOOL

Edward L. Shaw, Brookline, Mass., assignor to Shawlock, Inc., Boston, Mass., a corporation of Massachusetts Application June 9, 1938, Serial No. 212,629

2 Claims. (Cl. 145—124)

This invention relates to cutting tools and more particularly to a tool for performing both boring and routing. In my Patent No. 2,168,176, dated August 1, 1939, I have described a tool for boring a hole having an outer cylindrical portion and an inner conical portion tapering outwardly toward the bottom of the hole. My present invention is concerned with a novel boring and routing bit adapted for use with that tool.

Holes which are of uniform diameter for a portion of the depth thereof and then taper outwardly at the bottom are particularly useful for making joints of wood and the like, as described in my co-pending application, Ser. No. 212,628 filed June 9, 1938. The combined boring-routing bit of my present invention is provided with two radial cutting edges on its forward end adapted, upon rotation of the bit and in conjunction with a forwardly projecting centering point at the inner ends of said edges and forwardly projecting cutting points at the outer ends thereof, to bore a cylindrical hole. The bit is furthermore relieved at the outer end of one of said edges whereby the bit can be moved laterally in that direction and effect routing to form the hole with the bottom portion of its side wall tapering outwardly-downwardly. The primary object of my invention is the production of such an improved and novel bit adapted to bore and rout a hole of the above described nature.

A further feature of the invention resides in providing a novel tool adapted to bore a hole tapering outwardly not only at its bottom or inner end but also at its outer end, such tool being so constructed that the hole may be formed with a cylindrical portion of desired length between said tapered inner and outer end portions. This tool embodies the employment of a reaming cutter on and combined with the tool rearwardly of the boring and routing bit above described. This cutter is preferably on and integral with the shank of the boring-routing bit and located substantially in alignment with the routing bit longitudinally of the tool, all as hereinafter more specifically described.

These and other features of the invention will be best understood and appreciated from the following description of a preferred embodiment thereof, selected for purposes of illustration and shown in the accompanying drawing, wherein.

Figures 2, 3:
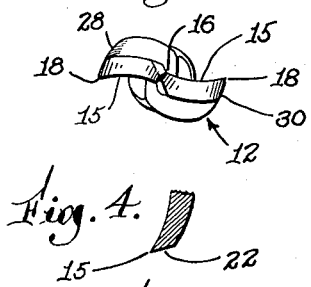
Fig. 2 is an end view of the cutting end of the bit.
Figure 2A:
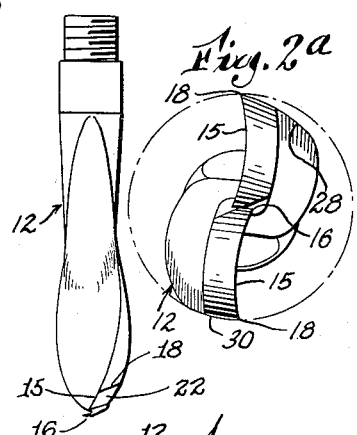

Fig. 2ª is an enlarged view like Fig. 2 and showing to an exaggerated degree the relief on the cutting bit at 28.

Figure 1:
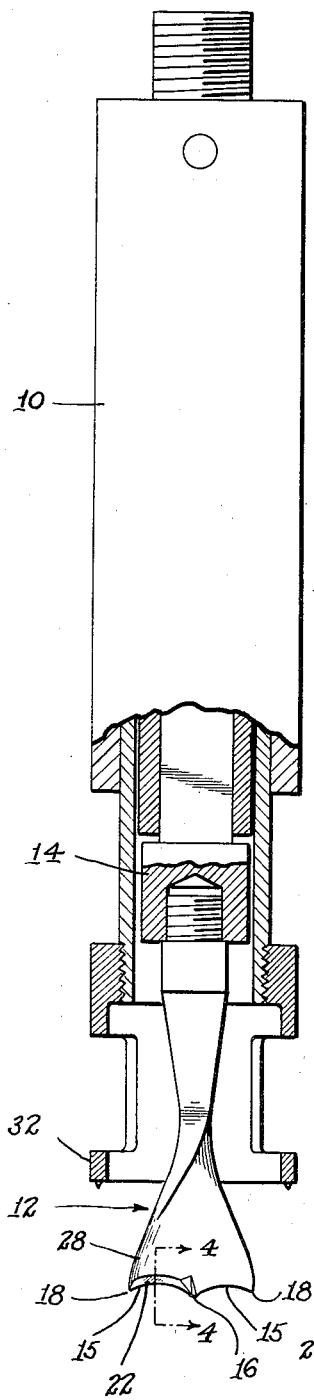
Fig. 1 is a side elevation of the novel tool bit embodying my invention, the same being illustrated in connection with the tool described in my said co-pending application Ser. No. 100,849.

Fig. 3 is a side elevation of the bit, taken at right angles to Fig. 1.

Figures 4, 5:
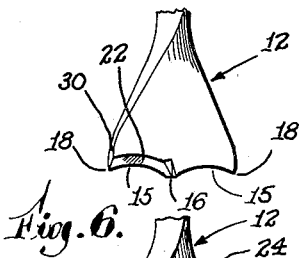

Fig. 4 is a sectional view taken on line 4—4 of Fig. 1.

Fig. 5 is a side elevation of the cutting end of the bit as seen from the rear of Fig. 1.

Figures 6, 7:
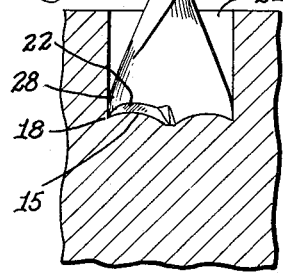

Fig. 6 illustrates the boring of the cylindrical portion of a hole.

Fig. 7 illustrates the routing of the inner end portion of such hole to form a side wall tapering outwardly-downwardly.

Figure 8:
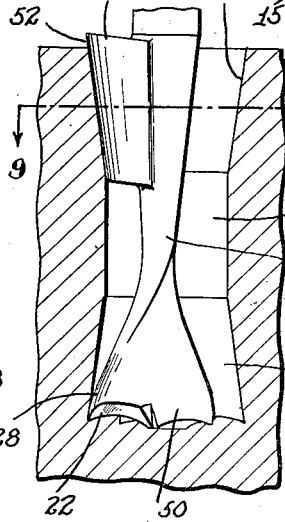

Fig. 8 shows the tool provided with a reaming cutter and illustrates the operation thereof.

Figure 9:
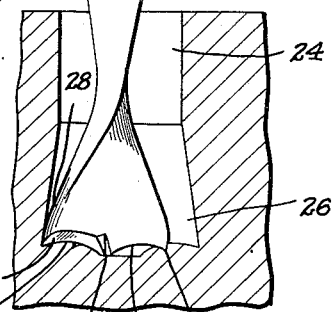

Fig. 9 is a sectional view taken on line 9—9 of Fig. 8.

In Fig. 1 I have illustrated the tool 10 claimed in my Patent No. 2,168,176 and have illustrated in connection therewith a tool bit 12 comprising my present invention claimed herein. This bit is threaded into a supporting shank 14 of the tool. The bit comprises a shank having on and integral with its forward end a spade-like blade substantially wider than the diameter of the shank portion of the bit and preferably of spiral configuration. The forward end of the blade is formed with two cutting edges 15 extending in a generally radial direction outwardly from the center of the bit. The cutting end is furthermore formed with a centering point 16 between the two cutting edges 15 and with two outer points 18 at the outer ends of said edges. All three of these points project further forward than the intermediate portions of the cutting edges and the centering point 16 projects further forward than the two outer points 18, the cutting edges preferably being substantially curved rearwardly as illustrated in Figs. 1 and 5–7. The cutting edge portions 15 of the bit also preferably project to a substantial degree laterally forward in the direction of cutting rotation, as particularly illustrated in Fig. 4, and are relieved laterally and rearwardly of the cutting edges at 22, whereby to form cutting edges rather than scraping edges.

The tool is adapted not only to bore a cylindrical hole 24, as illustrated in Fig. 6, but also to rout a tapering hole 26 (Fig. 7). Provision is made for this routing operation by relieving the bit at 28 at the outer end of one of the cutting edges 15 whereby this outer end 18—28, together with its cutting edge, will rout-cut when moved laterally toward that end. As illustrated in the drawing, the outer end of the other of said edges has a non-relieved surface 30 coincident with the side wall of a cylinder co-axial with the tool and having said wall passing around the bit at said outer ends of the cutting edges, whereby this surface 30 is adapted to engage the wall of the cylindrical hole 24 and cooperate with the centering point 16 to support the tool in true boring position (Fig. 6).

As illustrated in Fig. 1, the cutting bit 12 normally projects a substantial distance outwardly beyond a work engaging member 32 carried by the tool, and the tool is so constructed that it bores a cylindrical hole while the parts are in this position. However, when the member 32 comes into contact with the work, further forward movement of the tool causes the cutter to move laterally in the direction of the routing point 18—28, the bit 12 being so mounted in the tool 10 that this lateral movement will be in the direction of the routing point. As the tool continues its forward movement the bit continues its lateral movement whereby causing the cutter to rout the bottom portion 26 of the hole with a downwardly-outwardly tapering side wall, it being apparent that the relieving of the tool at 28 permits the relieved cutting point to bite further outwardly as the tool moves further into the work. It will also be seen that the constructing of the bit of relatively large diameter at its forward cutting end permits lateral movement of the bit (Fig. 7) to cut the bottom taper 26 without engagement of the shank of the bit with the cylindrical portion 24 of the hole. The resulting hole is shown in Fig. 7.

In some cases it is desired to bore a hole of the shape illustrated in Fig. 8, this hole having an intermediate cylindrical portion 40 and outwardly tapering end portions 42 and 44. In this case the tool bit 46 will be of such length as to project outwardly beyond the member 32 a distance equal to the combined portions 40 and 42 of the hole whereby the tool is adapted initially to bore a cylindrical hole of this length. In accordance with my invention the tool is provided with additional means for reaming the portion 42 of the hole to tapering form simultaneously with the routing of the bottom portion 44.

In Figs. 8 and 9, I have illustrated one form of tool for performing this reaming operation. As illustrated, I provide a cutting or reaming member 48 on and extending laterally of the shank 46 and rearwardly of the cutting end 50 thereof, this member having a cutting edge 52 tapering inwardly toward the cutting end 50 of the shank and adapted to cut the inwardly tapering wall 42. It will now be apparent that the tool initially cuts a cylindrical hole at 40—42 as above described and that the cutting edge 52 reams the portion 42 to the tapering shape illustrated as the end 50 of the tool routs out the portion 44 of the hole.

Having thus described my invention what I claim as new and desire to secure by Letters Patent is:

1. A combined boring-routing tool bit comprising a shank having on and integral with its forward end a spade-like blade substantially wider than the diameter of the shank portion of the bit, the blade having its forward end formed into two cutting edges extending outwardly respectively in opposite directions from the center of the bit and each terminating in a cutting point at the outer end of its cutting edge, the bit being relieved at the outer end of one of said edges whereby such outer end together with its cutting edge will rout-cut when moved laterally toward that outer end, and the outer end of the other of said edges having a non-relieved surface coincident with the side wall of a cylinder co-axial with the bit.

2. A combined boring-routing-reaming tool bit for forming a hole having outwardly tapering ends and an intermediate cylindrical portion, comprising a shank having on and integral with its forward end a spade-like blade substantially wider than the diameter of the shank portion of the bit, the blade having its forward end formed into two cutting edges extending outwardly respectively in opposite directions from the center of the bit, the blade having a centering point at the inner ends of said two cutting edges and having two cutting points respectively at the outer ends of said edges, all of said points extending further forward than the intermediate portions of the cutting edges, the centering point projecting further forward than said two outer points, and the bit being relieved at the outer end of one of said edges whereby said outer end together with its cutting edge will rout-cut when moved laterally toward that outer end, the outer end of the other of said edges having a non-relieved surface coincident with the side wall of a cylinder co-axial of the bit, and the forward end of the bit being relieved laterally and rearwardly of the cutting edges, and a cutting blade integral with and extending laterally and longitudinally of the shank rearwardly of said cutting edges and substantially in alignment with said relieved cutting edge longitudinally of the bit, said cutting blade having a cutting edge tapering inwardly toward the forward end of the bit and adapted to cut an inwardly tapering wall when the bit is moved laterally toward the relieved cutting point.

EDWARD L. SHAW.